United States Patent Office 3,346,543
Patented Oct. 10, 1967

3,346,543
METHOD OF PRODUCTION OF PHOSPHORUS CONTAINING POLYAMIDES
Boris Alexandrouvich Arbuzov, Kazan, Mark Abramovich Sokolovsky and Pavel Moiseevich Zavlin, Leningrad, and Galina Mikhailovna Vinokurova, Kazan, U.S.S.R., assignors to Institute Organicheskoi Khimii
No Drawing. Filed Feb. 26, 1964, Ser. No. 347,383
8 Claims. (Cl. 260—78)

This invention relates to the production of high molecular organic phosphorus compounds, and more particularly to the methods for production of polyamide-type phosphorus-containing polymers.

It is known that the introduction of phosphorus into a polymer imparts self-quenching properties to it.

Heretofore high molecular phosphorus-containing compounds have been produced by polycondensation.

Thus, for instance, V. V. Korshak et al. and K. A. Petrov et al. synthesized polyamide-type phosphorus-containing polymers from bis-(p-carboxyphenyl) alkyl- and aryl-phosphinate (K. A. Petrov and V. A. Parshina, "Khimicheskaya nauka i promashlennost," Chemical Science and Industry, 1959, vol. 4, No. 5, p. 686; T. M. Frunze, V. V. Korshak and others, Izvestiya Akademii Nauk SSSR, Otdelenie Khimicheskikh Nauk, 1958, p. 783).

However, the compounds obtained by this method had relatively low molecular weight.

Experience has shown that for the production of non-combustible polyamide resins the reaction of copolycondensation is more effective. It has been established that if a salt of aliphatic phosphorus-containing dicarboxylic acid with aliphatic diamine (for instance, hexamethylene diamine) is taken as one of the starting materials, then, the obtained polyamide-type phosphorus-containing resins will be of high molecular weight, and films made on their basis will have good mechanical properties and a lowered inflammability.

In accordance with the invention, a mixture containing the following components is subjected to polycondensation: a salt of aliphatic phosphorus-containing dicarboxylic acid with aliphatic diamine, a salt of aliphatic dicarboxylic acid with aliphatic diamine and lactam of aminocarboxylic acid.

In accordance with the ratio of the starting materials in the mixture the properties of the phosphorus-containing polyamide resins can be widely varied. By increasing the content of salt of phosphorus-containing dicarboxylic acid and aliphatic amine resins will be obtained, characterized by self-quenching properties of the obtained up to their full non-combustability.

At a definite ratio of the starting materials alcohol-soluble resins may be obtained the solutions of which can be used for the production of films.

The molecular weight of the resultant polyamide resins varies with the temperature and duration of the reaction.

In case the process is carried out at a temperature below 200° C. or over 240° C. the duration of polycondensation being the same or in case the process is carried out for less than 5 or more than 15 hours, the temperature being optimum, the obtained polymer will have low molecular weight.

In order to obtain phosphorus-containing polyamide resins with optimum properties, polycondensation should be carried out in a vacuum.

To reduce the destruction, it is advisable that polycondensation should be carried out in an inert gas atmosphere.

When realizing the invention it is preferable to use the salt of adipic acid with hexamethylenediamine (nylon salt) as one of the components, lactam of aminocaproic acid (caprolactam-K) as lactam of aminocarboxylic acid, and bis-(β-carboxyethyl) phenylphosphinoxide in the form of salt with hexamethylene diamine as phosphorus-containing dicarboxylic acid.

To prepare alcohol-soluble phosphorus-containing polyamide resins, it is necessary to keep equimolecular ratios of the starting components. In a three component system the ratio of the components will be as follows:

33.33:33.33:33.33 mole percent

The formation of phosphorus-containing polyamides may be represented by the following scheme:

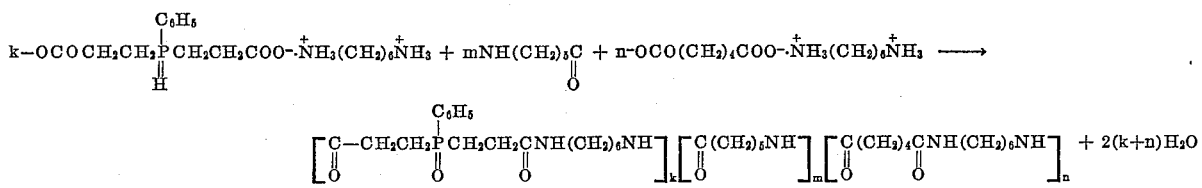

In order that the invention should be more easily understood the following example is given below by way of illustration.

EXAMPLE 2.02 g. of salt of bis-(β-carboxyethyl) phenyl phosphinoxide with hexamethylenediamine, 1.77 g. of caprolactam and 1.2 g. of salt of adipic acid with hexamethylene diamine, taken at 40.5:35.4:24.1, or 33.33:33.33:33.33, mole percent, placed in a test-tube equipped with a reflux condenser having a steam jacket.

The reaction mixture is heated for 7 hours at a temperature of 220° C. and atmospheric pressure, then for 3 more hours at a temperature of 220° C. and residual pressure of 15 mm. Hg.

As a result of polyamide resin is obtained with specific viscosity $\eta$ sp=0.64 and melting point of 138 to 140° C.; it contains phosphorus in the amount of 3.5 percent by weight.

A film is moulded from a 20 percent solution of the synthesized resin in 75 percent aqueous alcohol. The film thus obtained is less inflammable than polyamide films known hitherto. The tensile strength of this film is within the range of 2 to 2.5 kg. per square millimeter, its tensile elongation being 350 to 400 percent.

What we claim is:

1. A method for the production of polyamide-type phosphorus-containing polymers with self-quenching properties according to which polycondensation is carried out in the presence of salt of aliphatic phosphorus-containing dicarboxylic acid with aliphatic diamine and lactam of aminocarboxylic acid and at a temperature of 200 to 240° C., the relative portions of the three starting components being approximately equimolar.

2. A method for the production of polyamide-type phosphorus-containing polymers with self-quenching properties as claimed in claim 1, according to which polycondensation is carried out in the presence of salt of phosphorus-containing dicarboxylic acid of aliphatic series with aliphatic diamine.

3. A method for the production of polyamide-type phosphorus-containing polymers with self-quenching properties as claimed in claim 1, according to which polycondensation is carried out in the presence of lactam of aminocaproic acid.

4. A method for the production of polyamide type phosphorus-containing polymers with self-quenching properties, as claimed in claim 1, according to which polycondensation is carried out at a temperature of about 220° C.

5. A method for the production of polyamide-type phosphorus-containing polymers with self-quenching properties, as claimed in claim 1, according to which polycondensation is carried out for more than 5 but less than 15 hours.

6. A method for the production of polyamide-type phosphorus-containing polymers with self-quenching properties, as claimed in claim 1, according to which polycondensation is carried out in an inert gas atmosphere.

7. A method for the production of polyamide-type phosphorus-containing polymers with self-quenching properties, as claimed in claim 1, according to which polycondensation is carried out in a vacuum.

8. A method according to claim 1 wherein the starting materials are (1) salt of bis-($\beta$-carboxyethyl) phenyl phosphinoxide with hexamethylene diamine;
(2) caprolactam; and
(3) salt of adipic acid with hexamethylenediamine.

References Cited
UNITED STATES PATENTS

| | | | |
|---|---|---|---|
| 2,646,420 | 7/1953 | Morgan | 260—78 |
| 3,043,810 | 7/1962 | Deiehert et al. | 260—78 |
| 3,108,991 | 10/1963 | Pellon et al. | 260—78 |
| 3,116,268 | 12/1963 | Farago | 260—2 |

OTHER REFERENCES

Chemical Abstracts, vol. 54, p. 19554b, 1960, copy in Scientific Library.

WILLIAM H. SHORT, *Primary Examiner.*

H. D. ANDERSON, *Assistant Examiner.*